April 28, 1959
B. E. ANDERSON ET AL
2,884,366
BUBBLE TRAP FOR LIQUID SYSTEMS
Filed March 21, 1958
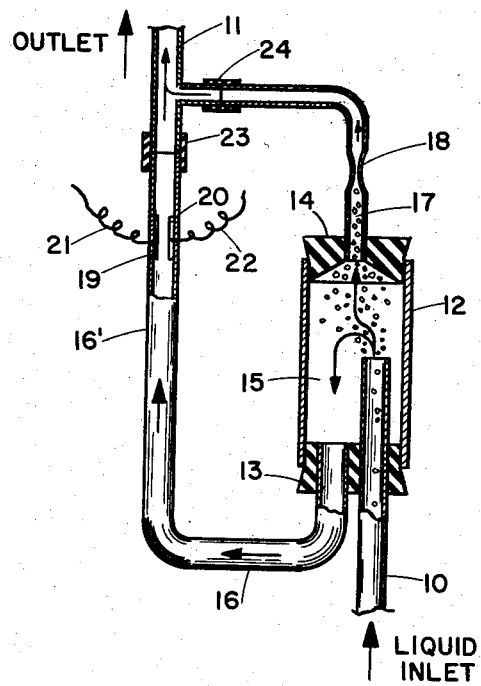
FIG. I
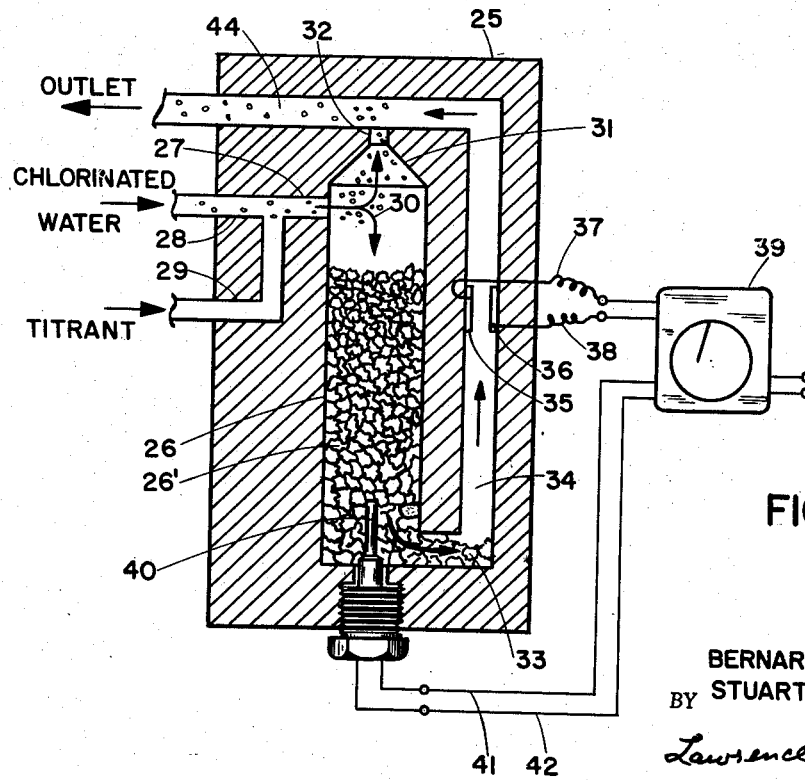
FIG. II
INVENTOR.
BERNARD E. ANDERSON
BY STUART W. SWEET
Lawrence H. Dalton
AGENT

United States Patent Office 2,884,366
Patented Apr. 28, 1959

2,884,366

BUBBLE TRAP FOR LIQUID SYSTEMS

Bernard E. Anderson, North Attleboro, and Stuart W. Sweet, Mansfield, Mass., assignors to The Foxboro Company, Foxboro, Mass., a corporation of Massachusetts Application March 21, 1958, Serial No. 723,039

1 Claim. (Cl. 204—195)

This invention relates to liquid systems which are subject to undesirable bubbles and has particular reference to a bubble trap system for providing a bubble-free portion in the liquid system.

As an example, this invention relates to an electrochemical measurement system wherein a liquid is passed through a pipe and an electro-chemical measurement is applied thereto. In such a system, air bubbles in the liquid seriously interfere with electro-chemical measurement. A specific example of this type of system is a system for measurement of residual chlorine in water.

The device of this invention obviates the prior art difficulties and provides a liquid measurement system with a portion thereof which is bubble free.

This invention is accomplished by providing a liquid system with suitable flow throughout the system, wherein the system includes a tank, a liquid inlet to the tank, and an outlet from the tank at the bottom of the tank. With this arrangement the bubbles from the inlet float upward in the tank, and a portion of the liquid flows into the bottom outlet, free from bubbles.

It is, therefore, an object of this invention to provide a new and improved liquid flow system involving a bubble trap to provide a bubble-free portion in the system.

Other objects and advantages of this invention will be in part apparent and in part pointed out hereinafter.

In the drawings:

Figure I is a schematic showing of a bubble trap liquid system in accordance with this invention; and Figure II is a showing of a development of the bubble trap liquid system according to this invention.

The illustrative embodiments of this invention shown and described herein are primarily systems which are continuously totally filled with liquid.

As shown in Figure I, the liquid system is provided with a main inlet pipe at the bottom thereof, indicated as at 10 and extending upwardly. The final outlet pipe is at the top of the drawing, indicated as at 11 and also extending upwardly. The system is provided with a central sleeve-like housing 12 which is arranged vertically along the axis of the housing, and this housing is provided with bottom and top end plugs 13 and 14. The housing 12 and the end plugs 13 and 14 therefor define a bubble tank 15. The inlet pipe 10 extends upwardly through the bottom plug 13 and into the bubble tank 15 to a point substantially above the bottom of the bubble tank 15, that is, substantially above the top face of the bottom plug 13. The bottom plug 13 also has extending downwardly therethrough an outlet pipe 16 which extends downwardly from a point flush with the top face of the bottom plug 13.

A further outlet from the bubble tank 15 is provided at the top thereof through the top plug 14 by means of an outlet pipe 17 which extends outwardly from the bubble tank 15 from a point flush with the inner face of the top plug 14. The inner face of the top plug 14 is tapered inwardly and upwardly to facilitate bubble movement into the pipe 17. Above the top plug 14 and outside of the bubble tank 15, the second outlet pipe 17 has a restricted portion 18 which acts as a flow reducer so that liquid flow from the inlet 10 and into the bubble tank 15 will travel in both directions, that is, up through the outlet pipe 17 and down through the outlet pipe 16. A smaller top outlet pipe without a restriction will accomplish the same flow result and is acceptable if it is sufficiently large to pass a sufficient amount of bubbles and as long as the major part of the flow is through the bottom outlet.

The size of the tank 15, the dimensions of the inlet and outlets, as well as the extent to which the inlet pipe extends into the tank 15 are functions of the nature of the liquid and its bubbles, and the rate of flow of the liquid, these factors being provided in such a manner as to allow all the bubbles to rise to the top outlet.

What ever bubbles are in the liquid as it flows into the bubble tank 15 from the inlet pipe 10 will by their nature tend to float upwardly in the tank 15 and for the most part will escape from the bubble tank 15 through the outlet pipe 17. On the other hand, the liquid flow which is downward and out of the bubble tank 15 through the outlet pipe 16, is bubble free because the bubbles in the liquid will not follow this flow in its downward course. The system is designed from a dimension standpoint so that the relative pressures tend to force the bubbles upward and the downward flow of the liquid is not enough to drag the air bubbles with it.

The bubble-free outlet pipe 16, after its exit from the bubble tank 15, then extends upwardly into a bubble-free, straight-line section 16', and above the bubble tank 15 the outlet pipes 16 and 17 are joined to merge their respective flows into the single outlet 11 for the overall system.

In the vertical, bubble-free section 16' of the outlet pipe 16, the bubble-free liquid flows upwardly, and in this section, a pair of electrodes 19 and 20 are provided within the pipe 16' with electrical leads 21 and 22 extending outwardly therefrom for a suitable connection to conventional electro-chemical measurement apparatus (not shown). An example of such measurement apparatus is an amperometric measurement system (not shown).

The electrodes 19 and 20 as shown represent thin flat plates on the inner surface of the pipe section 16'. These electrodes 19 and 20 do not ordinarily in any substantial way interfere with the flow of the liquid through the pipe section 16' since the inner diameter of the pipe between the electrodes 19 and 20 is very little less than that of the bubble-free pipe section 16'. The electrodes 19 and 20 may be placed closer together if it is desired to this provide a greater flow rate therebetween.

The system is provided with a pair of pipe end sleeve connections indicated at 23 and 24 which are simply conventional sleeve connections between two ends of glass piping as a convenience in assembly of the device of this invention.

In an illustrative example of a process with which the device of this invention may be associated, and which is not shown herein, chlorine is added to a public water system for purification purposes, and it is necessary to measure the chlorine concentration to make sure that it is neither more nor less than it should be to get the best benefits and the least harm from the chlorine in the water. A sample of such water is taken and, in the customary amperometric measurement procedure, certain concentrations of potassium iodide are added thereto in a titration process which results a liquid composition which is measurable in the electrode fashion illustrated in the drawing in such a way to provide a representation of the actual chlorine content of the sample water.

The various portions of the system as shown may be formed of glass, that is, the pipes may be glass and the tank sleeve may be glass, and the end plugs 13 and 14 may be of any suitable sleeve plugging substance such as rubber, for example. However, this is simply illustrative, and any suitable material may be used as desired.

When the system of this invention is closed and pressurized, the pipe directions, i.e., up, down, are generally immaterial. The important factor is that the tank 15, whatever its position, have a top outlet for bubble containing liquid, and a bottom outlet for bubble-free liquid.

Figure II shows a bubble trap assembly according to this invention. The illustrated use is that of another system for the preparation of a liquid for electro-chemical measurement. The Figure II showing is a specific assembly for use in an amperometric measurement of residual chlorine in water.

In the assembly of Figure II, means is provided for mixing chlorinated water and a suitable titrant, for trapping the bubbles in such a mixture, for electro-chemically measuring this mixture in a bubble-free section of the system, and for compensating such measurement with respect to temperature.

The structure of Figure II is a block 25 having a bubble tank 26 therein. This tank 26 is vertically disposed in operation and is cylindrical with the vertical disposition in the direction of the longitudinal axis of the cylinder. An inlet 27 is provided near the top of the tank 26 with a chlorinated water inlet 28 and a titrant inlet 29 provided and arranged to meet and merge into the inlet pipe 27. Thus, the mixture of titrant and chlorinated water enters the bubble tank 26 near the top thereof and flows both up and down, as indicated by the double arrow 30. The top of the chamber 26 is tapered inwardly and upwardly as at 31, to terminate in a relatively small outlet passage 32 from the tank 26. At the bottom of the tank 26, a bottom outlet passage 33 is provided, extending laterally and then upwardly into a bubble-free section 34 of the liquid system wherein is located a pair of electrodes 35 and 36, with electrical connections 37 and 38 therefrom, leading to a measuring instrument 39 which may be any suitable indicator, recorder, or controller device as described. With respect to the instrument 39 which is an amperometric measurement device, a temperature bulb 40 is mounted so as to extend up into the bottom of the bubble tank 26 with electrical connection leads 41 and 42 therefrom extending to the measurement instrument 39 with suitable conventional connections and arrangements therewithin such that the response of the temperature bulb 40 will properly modify the electrical measurement from the electrodes 35 and 36.

The bubble-free pipe section 34 of the liquid system extends upwardly beyond the electrodes 35 and 36 to a point above the bubble tank 26, and thereafter extends transversely across the top thereof, with the outlet 32 from the top of the bubble tank 26 opening into this portion of the pipe 33—34 to merge into a final outlet pipe section 44.

As an aid in suitably mixing the chlorinated water and the titrant, the bubble tank is substantially filled with stainless steel chips 26'. This prevents laminar flow and insures a proper mixture of the chlorinated water and the titrant as it passes downward through the bubble tank 26. It also serves as a means of trapping such bubbles as may be carried partially down into the tank 26 by the downward flow of the liquid stream.

This invention, therefore, provides a new and improved liquid measurement system embodying a bubble trap to provide a bubble-free section of the system.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

We claim:

A liquid flow system bubble trap device wherein a bubble tank is kept full of liquid, said device comprising a bubble tank having an upright conical top, a body of stainless steel chips in said tank, an inlet pipe terminating in said tank, an outlet pipe from the top of said tank at the apex of said cone, an outlet pipe from the bottom of said tank, whereby bubbles in said liquid either rise in said tank or are trapped in said body of chips and the liquid in said bottom outlet pipe is bubble free, said bottom outlet pipe being provided with an upward extension and said top outlet pipe having a junction with said extension to form a single final outlet pipe, said bottom outlet pipe having therein, between said tank bottom and said junction, an electrode arrangement as the sensing element of an electro-chemical measuring device, a side inlet to said inlet pipe for applying a modifying liquid to the liquid in said inlet pipe, said body of chips serving also to thoroughly mix said modifying liquid, and a temperature sensor element in said tank with response connections therefrom for application to said electro-chemical measuring device for temperature compensation action therein.

References Cited in the file of this patent

UNITED STATES PATENTS

| 1,919,861 | Rodhe | July 25, 1933 |
| 1,922,666 | Daynes | Aug. 15, 1938 |
| 2,114,234 | Ornstein et al. | Apr. 12, 1938 |
| 2,823,985 | Strange | Feb. 18, 1958 |